(12) United States Patent
Sullivan (10) Patent No.: US 6,453,464 B1
(45) Date of Patent: Sep. 17, 2002

(54) METHOD AND APPARATUS FOR CONVERTING COBOL TO JAVA

(75) Inventor: Brian J. Sullivan, Pleasanton, CA (US)

(73) Assignee: LegacyJ. Corp., Inc., San Jose, CA (US)

( * ) Notice: Subject to any disclaimer, the term of this patent is extended or adjusted under 35 U.S.C. 154(b) by 0 days.

(21) Appl. No.: 09/383,339

(22) Filed: Aug. 25, 1999

Related U.S. Application Data (60) Provisional application No. 60/099,200, filed on Sep. 3, 1998.

(51) Int. Cl.$^7$ .................................................. G06F 9/44
(52) U.S. Cl. ...................... 717/137; 717/136; 717/138; 717/139; 717/141; 717/142; 717/143; 717/144
(58) Field of Search ............................... 717/5, 2, 7, 8, 717/137, 136, 141, 142, 143, 144

(56) References Cited

U.S. PATENT DOCUMENTS

| | | | | |
|---|---|---|---|---|
| 4,567,574 A | * | 1/1986 | Saade et al. ................. | 717/155 |
| 5,432,930 A | * | 7/1995 | Song ............................. | 707/4 |
| 5,640,550 A | * | 6/1997 | Coker ......................... | 707/101 |
| 5,778,232 A | * | 7/1998 | Caldwell et al. ............ | 717/143 |
| 6,195,792 B1 | * | 2/2001 | Turnbull et al. ................ | 717/5 |
| 6,230,117 B1 | * | 5/2001 | Lymer et al. .................. | 703/22 |

OTHER PUBLICATIONS

"COBOL to Java Output," http://www.metamorphic.com/html/cob2java_output.html, 1 page, Copyright, 1996, 1997, 1998.

"COBOL Source Sample," http://www.metamorphic.com/html/cobol_source_sample.htm, 1 page, Copyright 1996, 1997, 1998.

Aho, Alfred V., "Compilers, Principles, Techniques, and Tools," Addison–Wesley, pp. 214–267, Copyright 1986.

Yang et al., "A Practical System of COBOL Program Reuse for Reengineering", IEEE, pp.: 45–57, 1997.*

McCollum et al., "The Improvement of a Software Design Methodology by Encapsulating Knowledge from Code", IEEE, pp.: 913–918, 1998.*

* cited by examiner

*Primary Examiner*—Gregory Morse
*Assistant Examiner*—Ted T. Vo
(74) *Attorney, Agent, or Firm*—Fenwick & West LLP (57) ABSTRACT

The present invention relates to a method for translating computer programs from a language having the attributes of computer programming language COBOL to a language having the attributes of the computer programming language Java. In particular, source language primitive functions are represented by archetypal templates having code that is selectable based upon the applicable case. In one implementation, the source language is translated to target language code which is, in turn, compiled by a target language compiler, thereby providing a two-step source language compiler.

26 Claims, 7 Drawing Sheets

FIG. 1

```
10 -- IDENTIFICATION DIVISION.
12 -- PROGRAM-ID.
14 -- {PROGRAM NAME}.
16 -- [ENVIRONMENT DIVISION.
18 ------ *> User's Code irrelevant to implementation.
20 -- ]
22 -- [DATA DIVISION.
24 ------ *> User's Code irrelevant to implementation.
26 --- ]
28 - [PROCEDURE DIVISION.
30 ------ *> User's Code irrelevant to implementation.
32 -- ]
34 -- [END-PROGRAM.
36 -- {PROGRAM NAME}.]
```

Figure 1a.

```
38 -- [public] class
40 -- {PROGRAM NAME}
42 -- [extending an object or implementing an interface is irrelevant to implementation]
44 -- {
46 ------ [User's Code irrelevant to implementation.]
48 -- }
```

Figure 1b.

```
10 -- IDENTIFICATION DIVISION.
12 -- PROGRAM-ID.
14 -- {PROGRAM NAME}.
16 -- [ENVIRONMENT DIVISION.
18 ------*> User's Code irrelevant to implementation.
20 -- ]
22 -- [DATA DIVISION.
24 ------*> User's Code irrelevant to implementation.
26 - ]
28 -- [PROCEDURE DIVISION.
30 ------*> User's Code irrelevant to implementation.
32 -- ]
50 ------ IDENTIFICATION DIVISION.
52 ------ PROGRAM-ID.
54 ------ {NESTED PROGRAM NAME}.
56 ------ [ENVIRONMENT DIVISION.
58 --------------- *> User's Code irrelevant to implementation
60 ------ ]
62 ------[DATA DIVISION.
64 --------------- *> User's Code irrelevant to implementation
66 ------]
68 ------[PROCEDURE DIVISION.
70 --------------- *> User's Code irrelevant to implementation
72 ------]
74 ------ [END-PROGRAM.
76 ------ {NESTED PROGRAM NAME}.]
34 -- [END-PROGRAM.
36 -- {PROGRAM NAME}.]
```

Figure 2a.

```
38 -- [public] class
40 -- {PROGRAM NAME}
42 -- [extending an object or implementing an interface is irrelevant to implementation]
44 -- {
46 ------[User's Code irrelevant to implementation]
78 ------static [public] class
80 ------{NESTED PROGRAM NAME}
82 ------[extends Y]
84 ------{
86 --------------- [User's Code not necessary for implementation]
88 ----- }
90 ----- [User's Code irrelevant to implementation]
48 --}

92 --- [public] class
94 --- {NESTED PROGRAM NAME}
96 --- implements
98 --- {CALLABLE PROGRAM INTERFACE}
100 --{
102 ----- [Possible optional methods not necessary for implementation]
104 ----- [public]
106 ----- {type of logical reference to this class}
108 ----- {redirect name}
110 ----- ({signature})
112 -----{
114 --------------- [Possible optional processing code not necessary for implementation.]
116 --------------- return {logical reference to class declared in line 78};
118 ----- }
120 ----- [Possible optional methods not necessary for implementation]
122 -- }
```

Figure 2b.

```
28 -- [PROCEDURE DIVISION.
200 ------ {PARAGRAPH NAME}.]
```
Figure 3a.

```
38 -- [public] class
40 -- {PROGRAM NAME}
42 -- [extending an object is irrelevant to implementation]
44 -- {
202 ----- [static] public {RETURN-TYPE} {PARAGRAPH NAME}
204 ----- {
206 ---------------- [User's Code irrelevant to implementation]
208 ----- }
48 -- }
```
Figure 3b.

```
28 -- PROCEDURE DIVISION.
210 ----- {SECTION NAME} SECTION.
200 ----- {PARAGRAPH NAME}.
```
Figure 4a.

```
38 -- [public] class
40 -- {PROGRAM NAME}
42 -- [extending an object is irrelevant to implementation]
44 -- {
202 ---- [static] public {RETURN-TYPE} {PARAGRAPH NAME}
204 ----- {
206 ---------------- [User's Code irrelevant to implementation]
208 ----- }
212 ----- [static] public {RETURN-TYPE} {SECTION NAME}
214 ----- {
216 ---------------- {RETURN-TYPE} {VARIABLE NAME}={INVOKE {PARAGRAPH NAME}};
218 ---------------- return {VARIABLE NAME};
220 ----- }
48 -- }
```
Figure 4b.

```
290 --- [public] interface
98 --- {CALLABLE PROGRAM INTERFACE}
100 --{
102 ----- [Possible optional methods not necessary for implementation]
104 ----- [public]
106 ----- {type of logical reference to this class}
108 ----- {redirect name}
110 ----- ({signature})
112 -----{
114 ---------------- [Possible optional processing code not necessary for implementation.]
116 ---------------- return {logical reference to this class};
118 ----- }
120 ----- [Possible optional methods not necessary for implementation]
222 ----- public {return type} call({SIGNATURE});
230 ----- public {return type} cancel({SIGNATURE});
122 -- }
```
Figure 5.

238 -- {DATA LEVEL} {VARIABLE NAME}
240 -- PIC|PICTURE {alphanumeric|alphanumeric-edited|numeric-edited|alphabetic picture}
242 -- [USAGE DISPLAY].

Figure 6a.

244 -- [static] [public|protected|private] final
245 -- {VARIABLE TYPE} {VARIABLE NAME}=
246 -- new {VARIABLE TYPE}({SIGNATURE});

Figure 6b.

238 -- {DATA LEVEL} {VARIABLE NAME}
250 -- PIC|PICTURE {numeric picture}
252 -- [USAGE DISPLAY].

Figure 7a.

244 -- [static] [public|protected|private] final
254 -- {DISPLAY TYPE} {VARIABLE NAME}=
256 -- new {DISPLAY TYPE}({SIGNATURE});

Figure 7b.

238 -- {DATA LEVEL} {VARIABLE NAME}
260 -- PIC|PICTURE {numeric picture}
262 -- [USAGE BINARY|COMP-5].

Figure 8a.

244 -- [static] [public|protected|private] final
264 -- {BINARY TYPE} {VARIABLE NAME}=
266 -- new {BINARY TYPE}({SIGNATURE});

Figure 8b.

238 -- {DATA LEVEL} {VARIABLE NAME}
270 -- PIC|PICTURE {numeric picture}
272 -- [USAGE PACKED-DECIMAL|COMP-3].

Figure 9a.

244 -- [static] [public|protected|private] final
274 -- {PACKED-DECIMAL TYPE} {VARIABLE NAME}=
276 -- new {PACKED-DECIMAL TYPE}({SIGNATURE});

Figure 9b.

```
290 -- {VARIABLE NAME} . {declare method}
292 -- ("{VARIABLE NAME}", "{picture}" [,irrelevant parameters]);
```
Figure 10.

```
28 -- [PROCEDURE DIVISION.
200 ------{PARAGRAPH NAME}.]
278 ------ EXEC JAVA
280 ------ [User's Code to be passed through translation unmodified.]
282 ------ END-EXEC
```
Figure 11.

```
28 -- [PROCEDURE DIVISION.
200 ------{PARAGRAPH NAME}.]
278 ------ EXEC SQL
294 ------ [User's Code to be passed through after translating to JDBC.]
282 ------ END-EXEC
```
Figure 12.

```
284 -- {COBOL STATEMENT ON LINE X IN FILE F}
```
Figure 13a.

```
286 -- {DEBUG CLASS}.{DEBUG METHOD}({LINE X},"FILE F", [,{LINE Z},{irrelevant parameters});
288 -- {JAVA STATEMENT ON LINE Z}
```
Figure 13b.

METHOD AND APPARATUS FOR CONVERTING COBOL TO JAVA

CROSS REFERENCE TO RELATED APPLICATION

This application claims priority under 35 USC §119(e) from provisional application Ser. No. 60/099,200, filed on Sep. 3, 1998, which is incorporated herein in its entirety.

FIELD OF ART

The method and apparatus of this invention relate generally to the translation of one logically defined language into another. More specifically, the method and apparatus relate to a system and process for translating computer programs written in a language having the attributes of COBOL into programs having the functionality of Java.

BACKGROUND ART

COBOL is an acronym for COmmon Business Oriented Language. COBOL is a high-level programming language for business data processing that was designed by the CODASYL Committee in 1960. COBOL is one of the most widely used programming languages in the world. In part, because it has a natural language style that makes it easy for a programmer who did not write the original program to make corrections and changes.

Java™ is a cross-platform programming language from Sun Microsystems that can be used to create animations and interactive features on World Wide Web pages. Java programs (a Java Class) may be distributed by embedding a program, or by embedding a call to the program, into an HTML document. HotJava™ and Netscape Navigator™ are Web browsers that run Java applications.

Both the functionality of COBOL and the functionality of Java are needed, in different ways, to strengthen the infrastructure of nearly every major financial institution in the United States. The Internet is helping to establish an international market for products and services making it a critical medium both now and in the future. Java, as a cross-platform language, can be used to establish a presence in this medium by creating interactive content that will entice users to purchase services or products from a web site regardless of the machine or device used to connect to the Internet. COBOL can help drive the engine that tabulates, tracks and records substantial amounts of financial data. Unfortunately, most institutions have large amount of legacy COBOL programs and very few Java Programs. For this reason, there are many businesses that would like to translate their COBOL programs into Java in order to use their previously developed COBOL programs for use on the Internet and across platforms.

In order to translate their COBOL programs into Java Programs, however, a method and apparatus for translating the COBOL program into a Java program is needed. More specifically, a method and apparatus for translating a COBOL program structure into a Java Class structure is needed. The method and apparatus needed would translate structural elements of COBOL, such as nested programs, procedure paragraphs and sections and record descriptions, into the analogous Java structure, such as creating methods within a Java source class file or creating a callable program interface.

SUMMARY OF THE INVENTION

The system and method of the present invention provide a COBOL to Java translator capable of translating both top-level COBOL programs and nested COBOL programs. The translation is further specified at the levels of the COBOL paragraph and section, which are translated into a Java method, and at the level of the COBOL variable, which is translated into the Java object level. Additional extensions to standard COBOL are also provided in order to ease the burden of the Java Developer Briefly, the invention processes a plurality of COBOL source code programs into a plurality of Java source code class files, including optional inner class files, and can process the procedures and data of the COBOL source code into the corresponding methods and data of the Java source code. It does so by recognizing a COBOL template and then outputting a corresponding completed Java template. The COBOL program template helps identify values that will need to be incorporated into the translated Java class file. The Java class template provides the location that the identified values should be placed in the class file. This process of identifying and applying the templates is repeated at each translation "level" as described herein. This process continues until the last translation is reached. At that point, the translation is complete. Several additional extensions to this process are also provided including the creation of a source file that provides both the Java source code and COBOL source code. Additional extensions enabling use of Structure Query Language (SQL) for database calls are also provided.

DETAILED DESCRIPTION

A Few Notes About the Description

In Java programs, the word "method" is the analogue of the "procedure" or "function" in other programming languages and must be distinguished from the word "method" meaning process by context. Additionally, the term Java program and Java class are used interchangeably to denote a file that is written in Java source code according to the specification developed by Sun Microsystems or any organization that develops Java standards in the future.

The parts of each data item are shown in the figures in an "archetypal template format". That is, the parts illustrate the structure of the COBOL source code and the structure of the Java source code with some components illustrated only by component name. These component names will be replaced by the instructions in the COBOL source code and in the Java source code after the method and system of the present invention translate the COBOL source code into the Java source code.

Within the text of each line in each figure, the bracket symbols [and ] surround optional items of the description; this is in keeping with standard computer language description.

In each figure, the same line or part number refers to the same item in each figure; line numbers are repeated in various figures even though not explicitly referenced in the description of each figure in order to help establish context.

Figure 1:
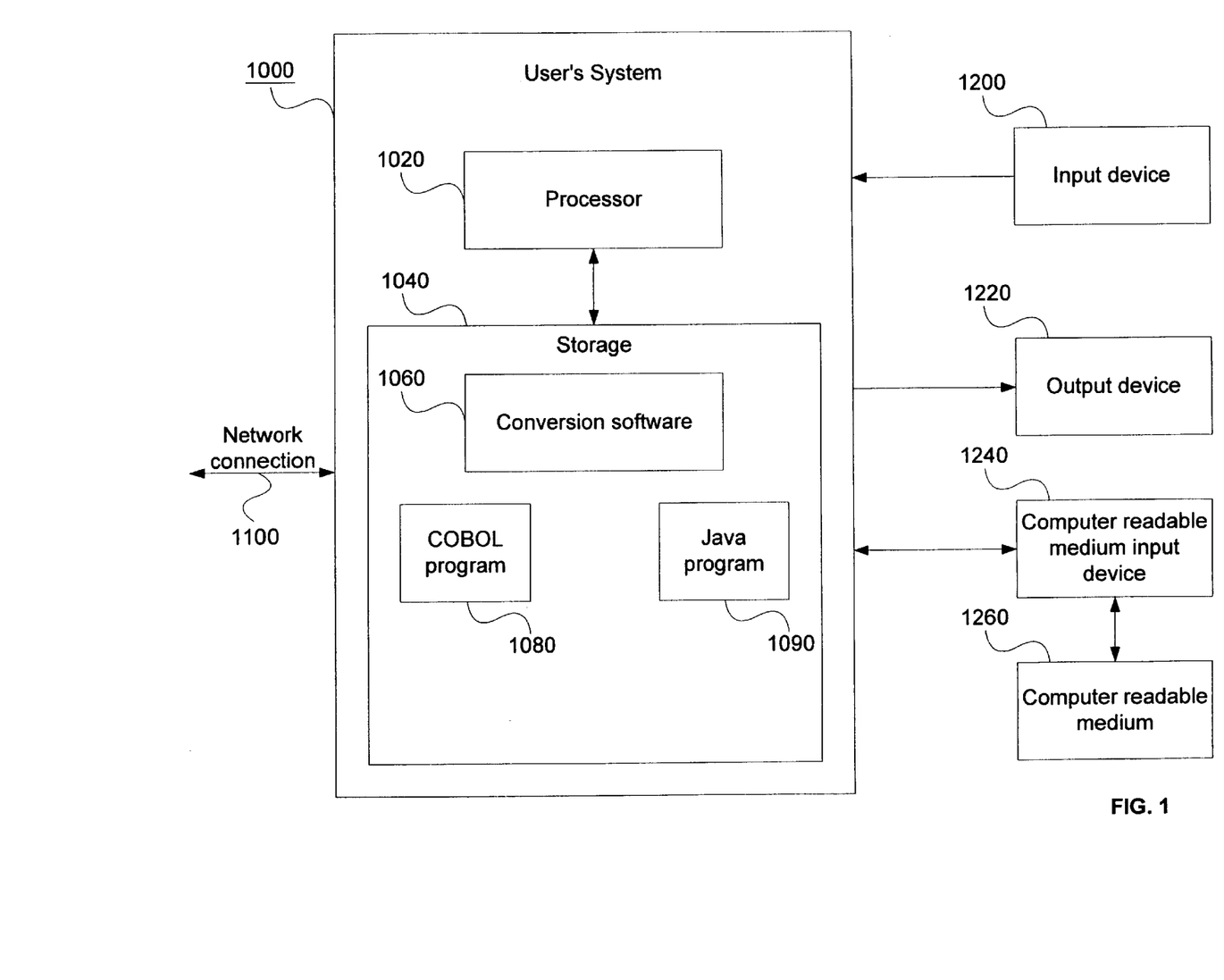
FIG. 1 is a block diagram illustrating a data processing system which can be used to implement the present invention.

FIG. 1 is a block diagram of a data processing system 1000, which has at least one processor 1020 and storage 1040. Storage 1040 of system 1000 includes comparison software 1060 and data structures used by the comparison software. Storage 1040 also includes at least one COBOL program 1080 and a Java Class 1090. The COBOL program is translated by conversion software 1060 into Java Class 1090. The steps of the described embodiment of the present invention are performed when instructions of a computer program are performed by processor 1020 (or another appropriate processor) executing instructions in storage 1040.

System 1000 also includes a network connection 1100, which connects system 1000 to a network such as the Internet, an intranet, a LAN, a WAN. System 1000 also includes an input device 1200, such as a keyboard, touch-screen, mouse, or the like. System 1000 also includes an output device 1220 such as a printer, display screen, or the like. System 1000 also includes a computer readable medium input device 1240 and a computer readable medium 1260. Computer readable medium 1260 can be any appropriate medium that has instructions such as those of conversion software 1060 stored thereon. These interactions are loaded from computer readable medium 1260 into storage area 1040. Instructions can also be loaded into storage area 1040 in the form of a carrier wave over network connection 1100. Thus, the instructions and data in storage 1040 can be loaded into storage via an input device 1200, via a network, such as the internet, a LAN, or a WAN, or can be loaded from a computer readable medium such as a floppy disk, CD ROM, or other appropriate computer readable medium. The instructions can also be downloaded in the form of a carrier wave over a network connection.

System 1000 also includes an operating system (not shown). A person of ordinary skill in the art will understand that the storage/memory also contains additional information, such as application programs, operating systems, data, etc., which are not shown in the figure for the sake of clarity. It also will be understood that data processing system 1000 (or any other data processing system described herein) can also include numerous elements not shown, such as additional data, software, and/or information in memory, disk drives, keyboards, display devices, network connections, additional memory, additional CPUS, LANS, input/output lines, etc.

It will be understood that the invention is not limited to any particular implementation or programming technique and that the invention may be implemented using any appropriate techniques for implementing the functionality described herein. The invention may be implemented in any appropriate operating system using any appropriate programming language or programming techniques.

The method of the present invention translates COBOL program into Java at several levels, including the program level, procedural level, and data level. As an initial matter, the present invention identifies a COBOL template that matches the input COBOL program at the level being translated. The invention then generates the structure in a Java Class using the Java template corresponding to the selected COBOL template. For clarity's sake, the COBOL and Java templates corresponding to each level will be described separately. A sample implementation of this method in source code is provided in Table 1 and provides further details of the described method. The code shall be considered part of the description.

Program Level Translation—Top Level

Figure 1A:
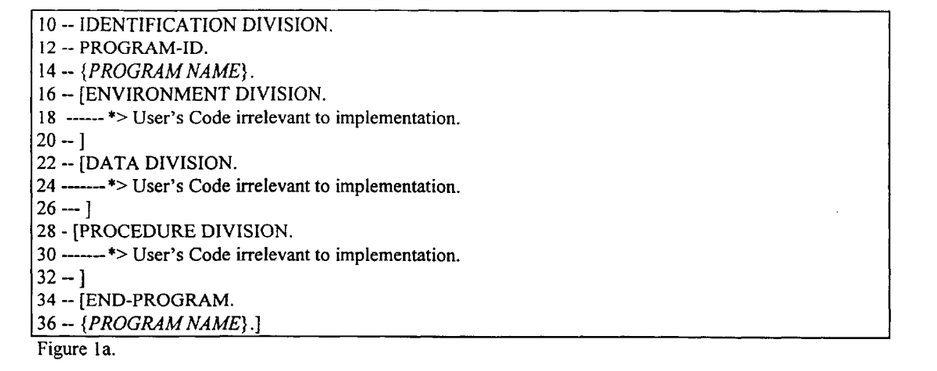
FIG. 1a is an archetypal template for a COBOL program without a nested program.
Figure 1B:
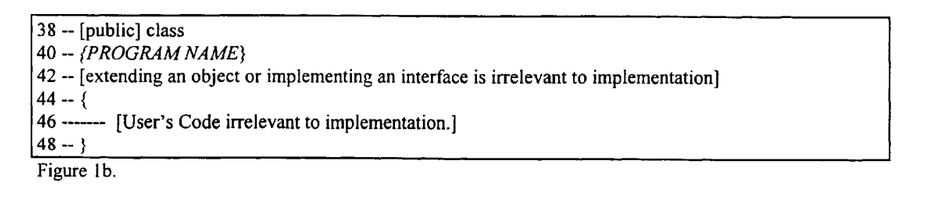
FIG. 1b is an archetypal template for a Java Class translated from a COBOL program without a nested program.

A COBOL program may be a top-level program or it may be a nested program, Nested programs are contained either directly or indirectly within a top-level program. Although a plurality of top-level programs may reside in the same computer file, each top-level program will be translated independently. A top-level COBOL program template is shown in FIG. 1a. The corresponding Java Class template is shown in FIG. 1b.

Referring now to FIG. 1a, line 10 and line 12 contain mandatory keywords. Keywords are words that signal the beginning or end of a structure in a programming language. For example, the keyword to begin a program written in the BASIC programming language is Begin. Line 14 of the template contains the COBOL program name. This name is placed in line 40 of the translated Java Class.

Line 16 contains keywords that identify the start of the environment division. The environment division at line 18 is optional and its contents are irrelevant for the program level translation (as noted in the comment on line 18). Line 20 ends the optional environment division.

Line 22 contains keywords that identify the start of the data division. The data division is optional and its contents are irrelevant for the program level translation (as noted in the comment on line 24). Line 26 ends the optional data division. The method for translating aspects of the COBOL data division into Java code appear in later figures.

Line 28 contains keywords that identify the start of the procedure division. The procedure division is optional and its contents are irrelevant for the program level translation (as noted in the comment on line 30). Line 32 ends the optional procedure division.

Line 34 contains keywords signaling the end of the program while line 36 restates the program name listed in line 14. Line 34 and line 36 must be listed together whenever another top-level COBOL program follows or when ending a nested COBOL program. In all other cases, line 34 and line 36 are optional.

Line 38 contains the declaration for a Java class. The preferred implementation includes the optional keyword public. Including the keyword public allows other Java classes outside of the current package to have access to the class. Line 40 of the template provides the space for the program name, the program name at live 40 will be the same name as the name in line 14 or a consistent modification thereof Line 42 notes that the Java class may optionally extend an object or implement interfaces. Whether the Java class extends or implements is irrelevant during program level translation. Line 44 is required and indicates the beginning of the Java class contents. Line 46 represents the contents of the class. As indicated on line 46, the contents of the class are irrelevant to the translation of the program at program level. The contents of the Java class are further described in other figures. Line 48 is required and indicates the end of the Java class's contents.

Program Level Translation—Nested Programs

Referring now to

Figure 2A:
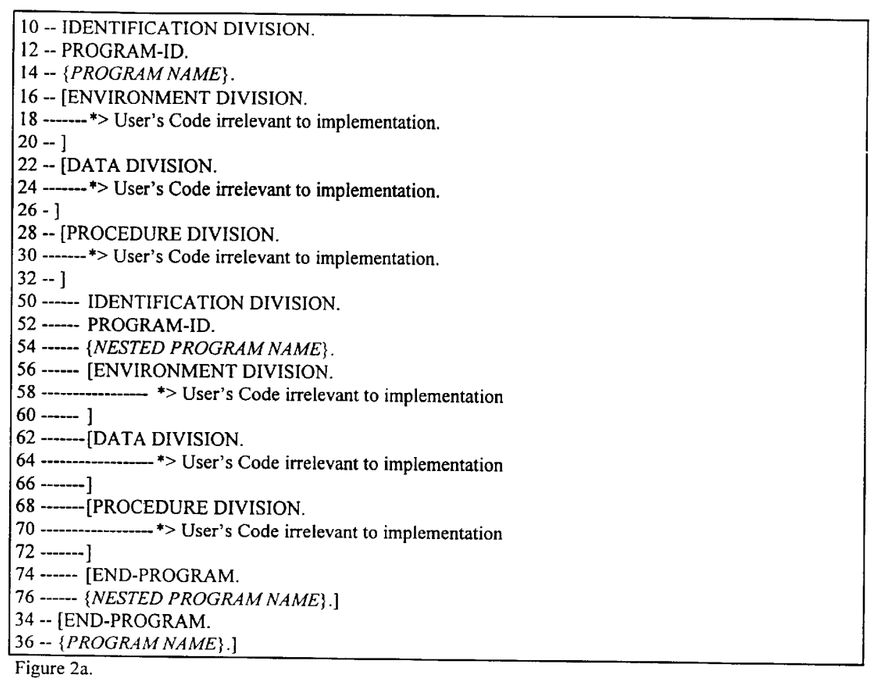
FIG. 2a is an archetypal template for a COBOL program with nested programs.
Figure 2B:
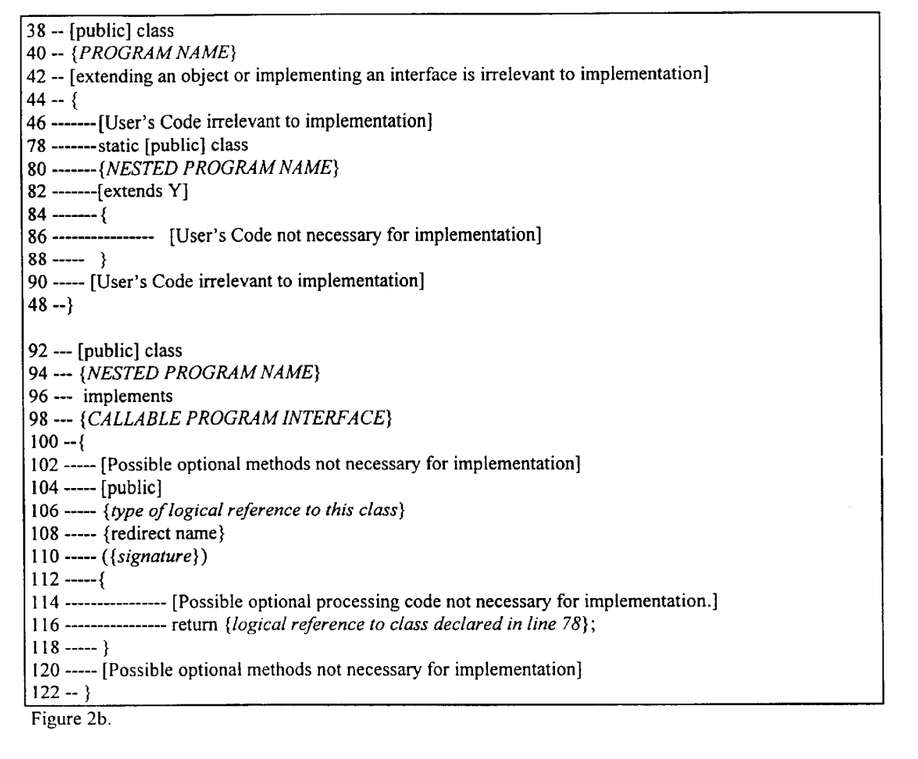
FIG. 2b is an archetypal template for a Java Class translated from a COBOL program having nested programs.

FIG. 2A, a top-level COBOL program containing a nested COBOL program is shown. The corresponding Java Class template is shown in FIG. 2b.

Line 50 and line 52 are required for a nested COBOL program and contain mandatory keywords. The keywords existence in the COBOL source code before lines 34 and line 36 are encountered indicates that the COBOL program is a nested COBOL program and as such FIG. 2a and FIG. 2b are selected as the translation templates. Line 54 is the COBOL template for the nested program name. During translation, this program name will be entered at line 40.

Line 56, line 58, line 60, line 62, line 64, line 66, line 68, line 70, and line 72 are the equivalent for nested COBOL programs of line 16, line 18, line 20, line 22, line 24, line 26, line 28, line 30, and line 32 for top-level COBOL programs. Line 74 and line 76 together signal the end of the nested COBOL program.

Line 78 is a declaration of the Java inner class. The keyword "public" is optional, but is part of the preferred implementation. Line 80 is the name of the Java inner class which should be the same as line 54 or a consistent modification of line 54. Line 82 may be any extension or implementation; extensions and implementations are part of Java, but not necessary to program level translation. Line 84 begins the inner class, and line 88 ends the inner class. Line 86 signifies that the code within the Java inner class is irrelevant for a program level translation. Line 90 signifies that the user's code for the top-level Java class may either be before or after the Java inner class.

Figure 5:
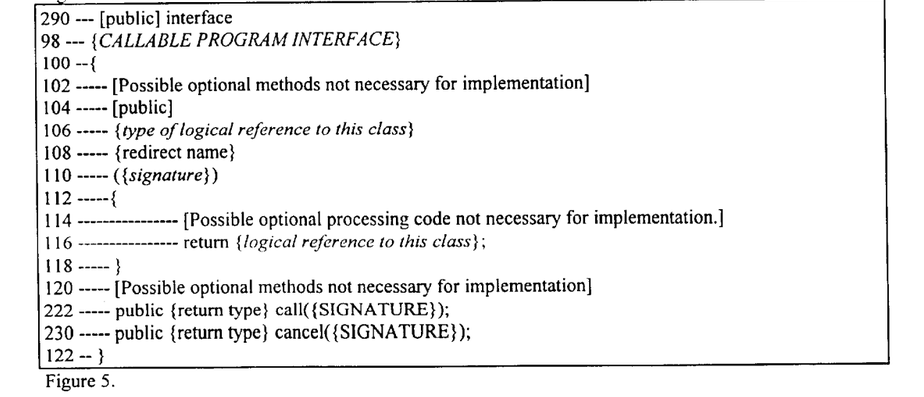
FIG. 5 is an archetypal Java template of the callable program interface.

Line 92 is a declaration for a separate Java top-level class to redirect calls. Line 94 is the same as line 54 or a consistent modification of line 54. Line 96 contains a mandatory keyword. Line 98 is the name of the callable program interface; the interface at line 98 interface must define, at a minimum, the methods defined in line 104, line 106, line 108, line 110, line 112, line 116, and line 118. FIG. 5 provides the preferred implementation of the callable interface of line 98. Line 100 begins the redirecting class. Line 102 notes that additional methods may be present, but are not required. Line 104 is the keyword public, which is optional but present in the preferred implementation. Line 106 is the Java type object name for the class reference, which may be any reference method capable of uniquely identifying the referenced class. The preferred implementation uses the callable program interface of line 98 which translated Java implements. Alternatively, the reference can be a String containing the name of the class or a reference to a Class type. Line 108 is the name of the redirecting method; in the preferred implementation the name is "redirect". Line 110 is the signature of the redirect method of the interface of line 98. Line 112 begins the redirecting method. Line 114 notes that additional code may be added, but is not required. Line 116 returns a reference to the class declared in line 78. Line 118 ends the redirect method. Line 120 notes that additional methods may exist, but are not required. Line 122 ends the redirect class.

Procedural Level Translation

Figure 3A:
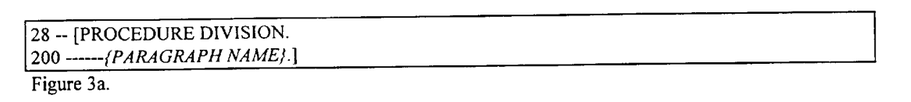
FIG. 3a is an archetypal COBOL template for paragraphs within the procedure division of a COBOL program.
Figure 3B:
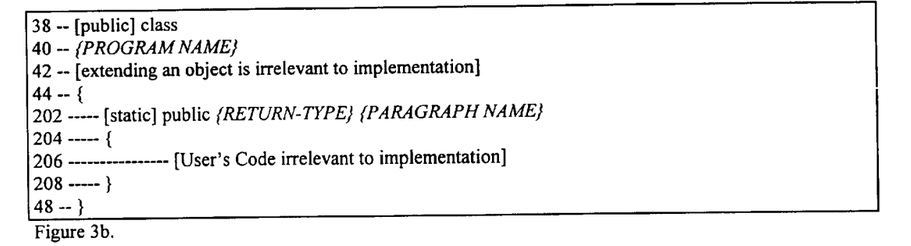
FIG. 3b is an archetypal Java template for the methods within the Java source class translated from the paragraphs in the COBOL program.

A COBOL program segment consisting of paragraphs is shown in FIG. 3a. The corresponding Java Class is shown in FIG. 3b. A plurality of COBOL paragraphs becomes a plurality of Java methods.

Line 200 contains the paragraph name template, where the paragraph name is the name of the paragraph in the user's COBOL source code followed by the required period. Line 202 is the declaration of the Java method representing Line 200's paragraph. The return-type is irrelevant to the procedural level translation. In the preferred implementation the type is "int" and represents the next paragraph number to execute. The keyword "static" is optional, and is not included in the preferred implementation. The PARAGRAPH NAME field is the Java translation of the name in line 200. Line 204 is a required open brace beginning the translated contents of the COBOL paragraph, and Line 208 is a required close brace ending the translated contents of the COBOL paragraph. Line 206 represents the translated contents of the COBOL paragraph, the details of which irrelevant to implementing the procedural level translation.

Figure 4A:
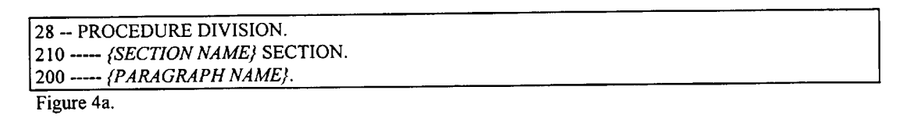
FIG. 4a is an archetypal COBOL template for sections within the procedure division of a COBOL program.
Figure 4B:
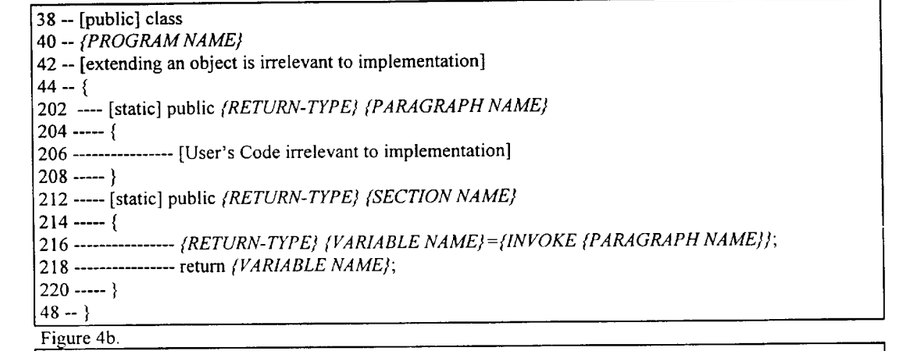
FIG. 4b is an archetypal Java template for methods within the Java source class translated from the sections in the COBOL program.

Referring now to FIG. 4a, a COBOL program segment consisting of sections which, in turn, consist of paragraphs is shown in FIG. 4a. The corresponding Java Class is shown in FIG. 4b. A plurality of COBOL paragraphs become a plurality of Java methods.

Line 210 contains the section name template, where the section name is the name of the section in the user's COBOL source code followed by the required keyword section and the required period.

Line 212 is the declaration of the Java method representing line 210's section. The return-type is the same as the return-type for line 202. The static keyword is optional, and not included in the preferred implementation. Line 214 is a required open brace beginning the section handler, line 220 is a required close brace ending the section handler. Line 216 contains the invocation of a paragraph contained within the section. The return type is the same as the return type in line 202. The Variable name in line 216 may be any Java name not already used. The text of invocation must be replaced a method call to the paragraph in line 202. A plurality of line 216's may be calling a plurality of line 202's representing a plurality of line 200's within the section represented by line 210. Line 218 connects the result of the final invocation line 216 to the resulting return type of line 212.

Data Level Translation

Figure 6A:
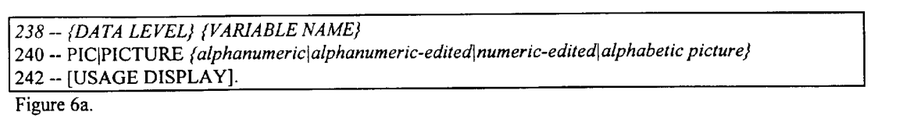
FIG. 6a is an archetypal COBOL template representing data record descriptions of non-numeric types within a COBOL program.
Figure 6B:
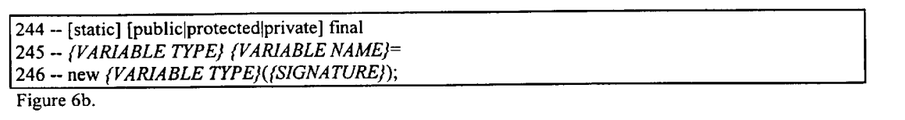
FIG. 6b is an archetypal Java template of the portion of Java Class corresponding to the data declaration of a COBOL non-numeric type.

Referring now to FIG. 6a, a declaration for the COBOL program's data item type, the declared type being one of alphabetic, alphanumeric, alphanumeric-edited, or numeric-edited, is shown. The corresponding Java declaration is shown in FIG. 6b.

Line 238 contains a prototype for a COBOL variable including level number and variable name. Line 240 contains the required "picture" or "pic" keyword followed by the picture string of type alphanumeric, alphanumeric-edited, numeric-edited, or alphabetic picture. The usage and display keywords of line 242 are optional; they define the storage mechanism for the COBOL program.

Line 244 is the declaration of the Java translation of line 238's variable. Static is optional, but is present in the preferred implementation. The scope modifier defines where in Java the variable is visible and is either public, protected, or private. Final is required for use by Java inner classes. Line 245 is the declaration of the variable's type and name. In the preferred implementation, the type is named Variable. The name is a Java name corresponding to the variable name in line 238. The equal sign is required. Line 246 is the creation of a new instance of the variable. The new keyword is required. The variable type is the same variable type from line 245. The parentheses are required. In the preferred implementation, the signature is empty.

Figure 7A:
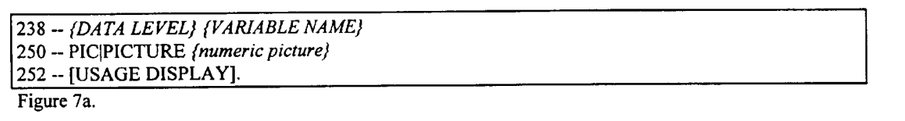
FIG. 7a is an archetypal COBOL template representing the data record description of numeric usage display types.
Figure 7B:
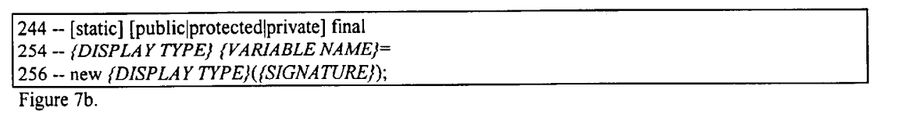
FIG. 7b is an archetypal Java template of the portion of the Java Class corresponding to the data record description of a COBOL numeric usage display types.

A COBOL program's data item declaration of the standard COBOL type numeric and standard COBOL usage display is shown in FIG. 7a. The corresponding Java declaration is shown in FIG. 7b.

Line 250 contains the required "picture" or "pic" keyword followed by the picture string of type numeric. The usage and display keywords of line 252 are optional; they define the storage mechanism for COBOL. Line 254 is the declaration of the variable's type and name. In the preferred implementation, the type is named Display. The name is the translated Java name of the variable name in line 238. The equal sign is required.

Line 256 is the creation of a new instance of the variable. The new keyword is required. The variable type is the same variable type from line 254. The parenthesis are required. In the preferred implementation, the signature is empty.

Figure 8A:
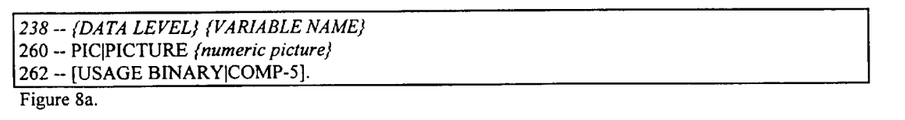
FIG. 8a is an archetypal COBOL template representing the data record description of numeric usage binary types.
Figure 8B:
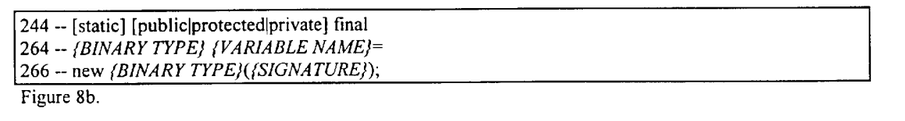
FIG. 8b is an archetypal Java template of the portion of the Java Class corresponding to the data record description of COBOL numeric usage binary types.

A COBOL program's data item declaration of the standard COBOL type numeric and standard COBOL usage binary is shown in FIG. 8a. The corresponding Java declaration is shown in FIG. 8b. Line 260 contains the required picture or pic keyword followed by the picture string of type numeric. The COBOL picture is determined solely by the COBOL programmer. The usage keyword is required, and binary or comp-5 is required; they define the storage mechanism for COBOL.

Line 264 is the declaration of the variable's type and name. The type is that of an object defined by the implementor. In the preferred implementation, the type is named Binary. The name is the translated Java name of the variable name in line 238. The equals sign is required.

Line 266 is the creation of a new instance of the variable. The new keyword is required. The variable type is the same variable type from line 264. The parenthesis are required. The signature is the implementor defined signature. In the preferred implementation, the signature is empty.

Figure 9A:
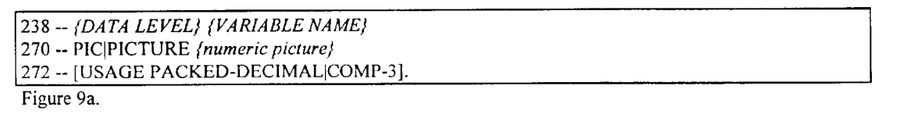
FIG. 9a is an archetypal COBOL template representing the data record description of numeric usage packed decimal types.
Figure 9B:
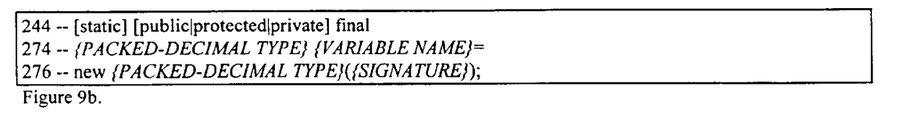
FIG. 9b is an archetypal Java template of the portion of the Java Class corresponding to the data record description of COBOL numeric usage packed decimal types.

A COBOL program's data item declaration of type numeric and usage packed-decimal is shown in FIG. 9a. The corresponding Java declaration is shown in FIG. 9b.

Line 270 contains the required picture or pic keyword followed by the picture string of type numeric. The COBOL picture is determined solely by the COBOL programmer. The usage keyword is required, and packed-decimal or comp-3 is required; they define the storage mechanism for COBOL.

Line 274 is the declaration of the variable's type and name. In the preferred implementation, the type is named Binary. The name is the translated Java name of the variable name in line 238. The equal sign is required.

Line 276 is the creation of a new instance of the variable. The new keyword is required. The variable type is the same variable type from line 274. The parentheses are required. In the preferred implementation, the signature is empty.

Call Interface for Translating Cross-Program Control Flow

The preferred implementation of the COBOL program's call interface in Java is shown in FIG. 5. A call interface preferably contains: a method to be used when the COBOL program CALL's another COBOL program; a method to be used when the COBOL program CANCEL's another COBOL program; and a method to be used to redirect such CALL's to another class to enable COBOL nested programs to function as Java inner classes.

Line 92 declares the interface. The keyword public is optional, but it is present in the preferred implementation. Line 290 is the name of the interface, which may be any valid Java name. The preferred implementation names line 290 "Callable Program". Line 222 is the declaration of the call method of the interface. The return type and signature must be included. The preferred implementation of each is void. Line 230 is the declaration of the cancel method of the interface. Specific knowledge of the return type or signature is irrelevant to the implementation, but must be included. The preferred implementation of each is void.

Extensions to COBOL Applicable in Translated Environment

Figure 10:
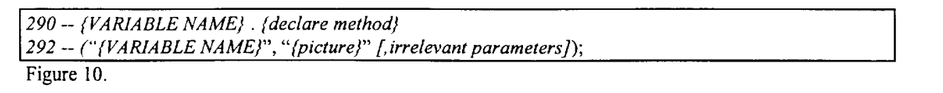
FIG. 10 is an archetypal Java template for the declaration of a COBOL variable that includes debug information.

The preferred implementation of the COBOL program's data debug information is shown in FIG. 10. Any implementation must contain a method call to the variable to be described, and pass information regarding the variable's name if not already known to Java through reflection and the picture type.

Line 290 represents a variable name in Java translated from a variable name in COBOL with its declare method being called with the signature of line 292. Line 292 specifies that the name of the variable and its picture type are to be included within the parameters for debug information as well as any other parameters the developer might include. The irrelevant parameters are irrelevant to debugging the data of the variable. The preferred implementation includes parameters giving the address in memory, size of the variable, and its relationship to other variables, but this is not necessary for debugging.

Figure 13A:
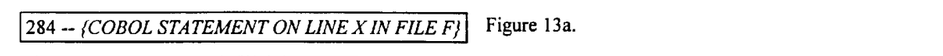
FIG. 13a is an archetypal COBOL template for a COBOL statement.
Figure 13B:
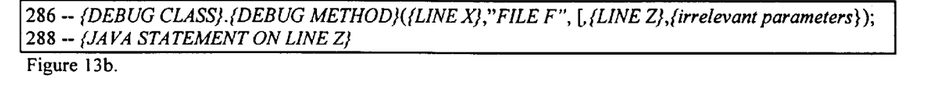
FIG. 13b is an archetypal Java template for representing a COBOL statement in Java that includes debug information.

The preferred implementation of a COBOL program's debug information for program code is shown in FIG. 13a and FIG. 13b, with FIG. 13a referencing a template of COBOL code as it appears in the original COBOL code with FIG. 13b showing the translated statement with debugging information enabled.

Line 284 represents a COBOL statement within the procedure division. Line 288 represents the translation of the COBOL statement to a Java statement. Line 286 represents debug information for line 288. The debug class in line 286 is a Java class possessing a Java method with the signature of line 286 capable of outputting information to the user or to a log file the line number and file information represented by the line number and file templates in line 286.

Java in COBOL

Figure 11:
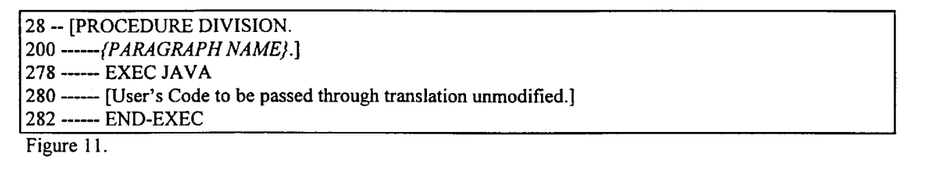
FIG. 11 is an archetypal COBOL template for the declaration in COBOL of a segment of Java code.

The preferred implementation of Java being inserted into the COBOL source code is shown in FIG. 11. The beginning scope name "EXEC JAVA" in line 278 is the preferred implementation because of its connotations to execute java, and the terminating scope name "END-EXEC" in line 282 is the preferred implementation because it is similar to other COBOL scope terminators, such as END-IF, END-ADD, etc. Although these names are preferred, they may be substituted with any other name not already used by COBOL. Any implementation must leave the Java code within the COBOL substantially alone. Additional features provided by this implementation includes allowing COBOL names to passed within the EXEC JAVA scope and translated to their Java names. Line 280 may be any valid Java source code the user desires.

Allowing Java code to be inserted into COBOL offers the COBOL program the ability to access features not normally present in COBOL. It also facilitates the interaction of COBOL and Java programs in multi-language environment and COBOL and Java programmers in a multi-developer environment.

SQL Access

Figure 12:
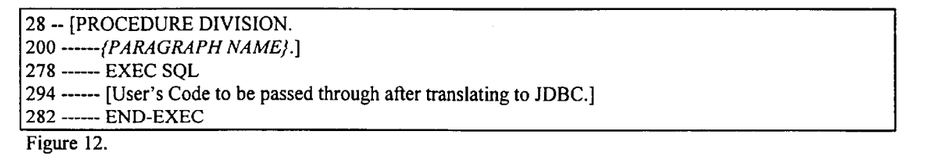
FIG. 12 is an archetypal COBOL template for the declaration in COBOL of a segment of SQL code.

The preferred implementation of SQL (Structured Query Language) for database access within the COBOL source code is shown in FIG. 12. The beginning scope name "EXEC SQL" in line 278 is the preferred implementation because of its use with embedding standard SQL in standard COBOL, and the terminating scope name "END-EXEC" is the preferred implementation because it is similar to other COBOL terminators, such as END-IF, END-ADD, etc. Although these names are preferred, they may be substituted with any other name not already used by COBOL. Any implementation must translate the SQL code within the beginning and terminating scope names into JDBC (Java DataBase Connectivity) calls, translating the SQL host variables into the names used by the Java conversion of COBOL data names. Line 294 may be any valid SQL source code the user desires.

Java Compilers for Compiling Translated COBOL

The preferred implementation of this invention includes a Java compiler to compile the translated Java source code after translation. The compilation may be to Java byte-code usable across the Internet with Web browsers or it may be to native executables and usable just like any other executable on a particular computer platform. The preferred implementation of the Java compiler is the usage of a Java byte-code compiler. Any Java compiler substantially supporting Java 1.1 or above is sufficient.

Operation

A computer program developed according to the specifications of this invention operates on a general purpose computer reading a COBOL source code program and analyzing it grammatically using known tools. This analysis can be done by hand-coding a parser as described in Aho, et al. (pp.215–259), or it can be done using an automatically generated parser, also as described in Aho, et al. (pp.259–266). The preferred implementation uses the yacc tool to do this analysis described by Aho, et al. (pp.259–266).

After analyzing the COBOL program, the appropriate template is chosen from the figures and claims. Upon recognizing a COBOL template, the corresponding Java template is completed using the data described within the description section, and then that completed template is output.

With each line of COBOL input, the program increases a COBOL line counter to track the COBOL line number. With each line of COBOL output, the program increases a Java line counter to track the Java line number. This line counters information can be used when outputting debugging information in order to complete the statement debugging template.

Summary

To summarize, the invention processes a plurality of COBOL source code programs into a plurality of Java source code class files, including optional inner class files, and can process the procedures and data of the COBOL source code into the corresponding methods and data of the Java source code. It does so by recognizing a COBOL template and then outputting a corresponding completed Java template.

Although the description above contains many detailed descriptions, these descriptions should not be construed as limiting the scope of the invention but merely as providing illustrations of some of the presently preferred implementations of this invention. For example, names generated by the invention may be consistently modified, spacing between tokens in the templates is irrelevant and may be modified, and order of methods within a class does not effect the integrity of the invention. Thus the scope of the invention should be determined by the appended claims and their legal equivalents, rather than by examples given.

I claim:

1. A method for translating a COBOL program written in COBOL source code and creating a Java program which includes the Java source code translation of the COBOL program, comprising:

applying a COBOL program level template to the COBOL program;

creating the Java program with a Java program level template;

responsive to keywords indicating the start of a paragraph in the COBOL program, applying a paragraph template to the COBOL program's paragraph and extracting data fields;

creating a Java method in Java source code by applying a Java paragraph conversion template which inserts the data fields extracted from the COBOL program during the step of applying the paragraph template to the COBOL program;

responsive to keywords indicating the start of a section in the COBOL program, applying a section template to the COBOL program's section and extracting data fields;

creating a Java method in Java source code by applying a Java section conversion template which inserts the data fields extracted during the step of applying the section template to the COBOL program;

responsive to keywords indicating the presence of variables of COBOL USAGE type in the COBOL program, applying a variable template to the COBOL program's variables and extracting data fields; and creating a Java object in Java source code by applying a Java variable conversion template which inserts the data fields extracted during the step of applying the variable template to the COBOL program.

2. A method for translating a COBOL program to a Java program having the equivalent functionality as the COBOL program when executed, the method comprising:

responsive to keywords indicating the start of the COBOL program:
applying a COBOL program level template to the COBOL program,
extracting identification data fields from the COBOL program, and
translating the extracted identification data fields to identification data fields in the Java program;

responsive to keywords indicating the start of a procedural division in the COBOL program:
extracting procedural data fields from the procedural division in the COBOL program, using a COBOL paragraph conversion template and a procedural section conversion template, and
translating the extracted procedural data fields from the COBOL program to procedural data fields in the Java program to create a Java method in the Java program; and responsive to keywords indicating the start of a data division in the COBOL program:
extracting variable data fields from the data division in the COBOL program, and
translating the extracted variable data fields into data fields in the Java program to create a Java object in the Java program.

3. The method of claim 2, wherein the step of creating a Java object further comprises the step of creating a numeric-type object.

4. The method of claim 2, wherein the extracted data fields have one or more names, and wherein the method further comprises:
converting the names to a consistent case;
converting dashes within the names to a consistent character;
converting the names conflicting with at least one of Java reserved words, Java methods, and Java variables to the same name; and
converting a COBOL name hierarchy stored in the COBOL program to a Java name hierarchy.

5. The method of claim 2, wherein the COBOL program further includes a nested program, and wherein the method further comprises:
creating a nested Java program for the COBOL nested program; and
inserting the created nested JAVA program for the nested COBOL program into the JAVA program.

6. The method of claim 2, wherein the created data object stores and retrieves data in a standard byte array format.

7. The method of claim 2, wherein the created Java object performs an equivalent functionality as a COBOL STRING verb.

8. The method of claim 2, wherein the created Java object performs an equivalent functionality as a COBOL ADD verb.

9. The method of claim 2, wherein the created Java object performs an equivalent functionality as a COBOL MOVE verb.

10. The method of claim 2, further comprising:
inserting the extracted procedural data fields into the Java program without translation.

11. The method of claim 10, wherein the inserting step further comprises:
locating a beginning predetermined token in the extracted procedural data fields;
locating an ending predetermined token in the extracted procedural data fields; and
inserting, into the Java program, the extracted procedural data fields located between the beginning predetermined token and the ending predetermined token.

12. The method of claim 11, wherein the beginning predetermined token is "EXEC Java."

13. The method of claim 11, wherein the beginning predetermined token is "EXEC SQL."

14. The method of claim 11, wherein the ending predetermined token is "END EXEC."

15. The method of claim 2, wherein the generated Java program includes a CALL interface 'call.'

16. The method of claim 2, wherein the generated Java program includes a CALL interface 'cancel.'

17. The method of claim 2, further comprising the step of compiling the generated Java program.

18. The method of claim 2, further comprising the step of including debug information to the generated Java program.

19. The method of claim 18, wherein the debug information further comprises the name for each extracted variable data field.

20. The method of claim 18, wherein the debug information further comprises a COBOL usage type for each extracted variable data field.

21. The method of claim 18, wherein the debug information further comprises the names of the extracted procedural data fields.

22. The method of claim 18, wherein the debug information further comprises line numbers of the extracted procedural data fields.

23. A method for translating a COBOL program to a Java program having the equivalent functionality as the COBOL program when executed, the method comprising:

responsive to keywords indicating the start of the COBOL program:
applying a COBOL program level template to the COBOL program,
extracting identification data fields from the COBOL program, and
translating the extracted identification data fields to identification data fields in the Java program;

responsive to keywords indicating the start of a paragraph in the COBOL program:
applying a COBOL paragraph template to the paragraph in the COBOL program,
extracting procedural data fields from the paragraph, and
translating the extracted procedural data fields from the paragraph to procedural data fields in the Java program to create a Java method;

responsive to keywords indicating the start of a procedural section in the COBOL program:
applying a procedural section template to the procedural section in the COBOL program,
extracting procedural data fields from the procedural data section, and
translating the extracted procedural data fields from the procedural section to procedural data fields in the Java program to create a Java method;

responsive to keywords indicating variables of COBOL USAGE type in the COBOL program:

applying a variable template to the COBOL program's variables, extracting variable data fields from the COBOL program, and translating the extracted variable data fields into variable data fields in the Java program to create a Java object in the Java program.

24. A computer program product stored on a computer readable medium for translating a COBOL program to a Java program having the equivalent functionality as the COBOL program when executed, the computer program product controlling a processor coupled to the medium to perform the operations of:

responsive to keywords indicating the start of the COBOL program:

applying a COBOL program level template to the COBOL program, extracting identification data fields from the COBOL program, and translating the extracted identification data fields to identification data fields in the Java program;

responsive to keywords indicating the start of a procedural division in the COBOL program:

extracting procedural data fields from the procedural division in the COBOL program, using a COBOL paragraph conversion template and a procedural section conversion template, and translating the extracted procedural data fields from the COBOL program to procedural data fields in the Java program to create a Java method in the Java program; and responsive to keywords indicating the start of a data division in the COBOL program:

extracting variable data fields from the data division in the COBOL program, and translating the extracted variable data fields into data fields in the Java program to create a Java object in the Java program.

25. A method for translating a COBOL program to a Java program having the equivalent functionality as the COBOL program when executed the method comprising:

responsive to keywords indicating the start of the COBOL program:

applying a COBOL program level template to the COBOL program, extracting identification data fields from the COBOL program, and translating the extracted identification data fields to identification data fields in the Java program;

responsive to keywords indicating the start of paragraph in the COBOL program:

applying a COBOL paragraph template to the paragraph in the COBOL program, extracting procedural data fields from the paragraph, and translating the extracted procedural data fields from the paragraph to procedural data fields in the Java program to create a Java method; and responsive to keywords indicating the start of a procedural section in the COBOL program:

applying a procedural section template to the procedural section in the COBOL program, extracting procedural data fields from the procedural section, and translating the extracted procedural data fields from the procedural section to procedural data fields in the Java program to create a Java method.

26. A system for translating a COBOL program to a Java program having the equivalent functionality as the COBOL program when executed, the system comprises:

a portion for applying a COBOL program level template to the COBOL program, extracting identification data fields from the COBOL program, and translating the extracted identification data fields to identification data fields in the Java program, responsive to keywords indicating the start of the COBOL program; and a portion for extracting procedural data fields from the procedural division in the COBOL program, using a COBOL paragraph conversion template and a procedural section conversion template and translating the extracted procedural data fields from the COBOL program to procedural data fields in the Java program to create a Java method in the Java program, responsive to keywords indicating the start of a procedural division in the COBOL program.

* * * * *